US012404876B2

(12) United States Patent
Evans

(10) Patent No.: US 12,404,876 B2
(45) Date of Patent: Sep. 2, 2025

(54) FAN BLADE CLEANING DEVICE

(71) Applicant: Heather Evans, Canton, GA (US)

(72) Inventor: Heather Evans, Canton, GA (US)

( * ) Notice: Subject to any disclaimer, the term of this patent is extended or adjusted under 35 U.S.C. 154(b) by 45 days.

(21) Appl. No.: 18/310,678

(22) Filed: May 2, 2023

(65) Prior Publication Data

US 2024/0052855 A1 Feb. 15, 2024

Related U.S. Application Data

(60) Provisional application No. 63/397,032, filed on Aug. 11, 2022.

(51) Int. Cl.
*F04D 29/70* (2006.01)
*B08B 1/14* (2024.01)

(52) U.S. Cl.
CPC ............ *F04D 29/703* (2013.01); *B08B 1/143* (2024.01)

(58) Field of Classification Search
CPC ...... F04D 29/703; F04D 29/38; F04D 25/088; B08B 1/143
See application file for complete search history.

(56) References Cited

U.S. PATENT DOCUMENTS

| | | | | |
|---|---|---|---|---|
| 4,823,431 | A * | 4/1989 | Carpenter | A47L 9/06 15/235 |
| 5,018,944 | A | 5/1991 | Bielecki | |
| 5,281,093 | A * | 1/1994 | Sedlak | F04D 29/38 416/62 |
| 5,319,821 | A | 6/1994 | Nicholson | |
| 5,516,264 | A * | 5/1996 | Anetrini | F04D 25/088 416/62 |
| 5,947,686 | A * | 9/1999 | Keyes | F04D 29/388 239/45 |
| 6,022,192 | A * | 2/2000 | DeLaHoz | F04D 25/088 416/62 |
| 6,782,579 | B1 | 8/2004 | Grimm | |
| 2002/0084011 | A1* | 7/2002 | Rochon | F04D 29/382 150/160 |
| 2004/0141848 | A1* | 7/2004 | Beaven | F04D 29/703 416/247 R |
| 2006/0288508 | A1* | 12/2006 | Knopow | B08B 1/143 15/229.6 |
| 2007/0212222 | A1* | 9/2007 | White-Burnett | F04D 25/088 416/62 |
| 2011/0035891 | A1 | 2/2011 | Chew | |
| 2017/0030379 | A1* | 2/2017 | Garcia | F04D 25/088 |
| 2018/0000309 | A1* | 1/2018 | Wright | A47L 13/253 |
| 2018/0135656 | A1* | 5/2018 | Totten | A47L 13/38 |
| 2019/0210070 | A1* | 7/2019 | Wright | A47L 25/00 |
| 2019/0240705 | A1* | 8/2019 | Wright | A47L 25/00 |
| 2020/0141424 | A1* | 5/2020 | Dobbs | A47L 4/02 |
| 2020/0318643 | A1* | 10/2020 | Fulcher | F04D 29/703 |

(Continued)

*Primary Examiner* — Aaron R Eastman

(74) *Attorney, Agent, or Firm* — Brennan, Manna & Diamond, LLC

(57) ABSTRACT

The present invention relates to a novel fan blade cleaning device. The device is a no mess, no ladder cleaning device that easily and safely cleans ceiling fan blades and traps dust in one motion. The device comprises a blade component that encloses a ceiling fan blade and a finger duster component secured to the opening of the blade component for dusting. The blade component and the finger duster component are then both secured to a telescoping pole component which can be extended to various heights.

5 Claims, 3 Drawing Sheets

(56) References Cited

U.S. PATENT DOCUMENTS

| | | | | |
|---|---|---|---|---|
| 2022/0192448 | A1* | 6/2022 | Kronenberger | F04D 25/088 |
| 2022/0386832 | A1* | 12/2022 | Hall | B25G 1/04 |
| 2024/0151237 | A1* | 5/2024 | Richardson, Jr. | F04D 25/088 |

* cited by examiner

FAN BLADE CLEANING DEVICE

CROSS-REFERENCE TO RELATED APPLICATION

The present application claims priority to, and the benefit of, U.S. Provisional Application No. 63/397,032, which was filed on Aug. 11, 2022, and is incorporated herein by reference in its entirety.

FIELD OF THE INVENTION

The present invention relates generally to the field of fan blade cleaning devices. More specifically, the present invention relates to an improved fan blade cleaning device that provides users with a cleaning tool designed to remove and collect dust from ceiling fans. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in fan blade cleaning devices. Generally, cleaning ceiling fan blades can be a frustrating, dangerous, and time-consuming process. People may need to climb on ladders to brush off dust, risking slips and falls. Further, cleaning dust off of fan blades typically causes the dust to float through the air and gather on the floor, requiring additional cleaning.

In particular, dust, dirt, allergens, and debris can be quickly and easily distributed through a living room, kitchen, bedroom, or den via a standard ceiling fan. While ceiling fans offer consumers an energy efficient means of cooling their environments, these devices readily attract harmful allergens and irritating dust and debris. Easily settling on the dormant blades of a ceiling fan, microscopic dust mites, mold spores, pollen, bacteria, and pet dander are quickly blown about the room once the fan is activated. These airborne contaminants can often times contribute to poor indoor air quality, and result in inhibited breathing and respiratory illness.

Dirt, dust, and grime hidden high atop the blades of ceiling fans can cause allergic reactions, itchy and watery eyes, sneezing, coughing and, for many people, dangerous asthmatic episodes. Because of this problem, regularly cleaning the blades of ceiling fans is essential in order to maintain an overall clean room.

In a conventional method of cleaning ceiling fans, a person will stand on a ladder or stool so the blades can be reached and then cleaned with a cloth or brush. Because such cleaning operations are so arduous to perform, a majority of ceiling fan blades remain totally uncleaned or are not cleaned nearly as often as needed. As such, an improved means to sanitize and clean ceiling fan blades is needed.

Therefore, there exists a long-felt need in the art for a fan blade cleaning device that provides users with a cleaning tool designed to remove and collect dust from ceiling fans in one swift, convenient motion. There is also a long-felt need in the art for a fan blade cleaning device that includes a six-inch-deep finger duster opening strip within an enclosed fabric case that is placed over a fan blade to remove dust with ease and no mess. Further, there is a long-felt need in the art for a fan blade cleaning device that features an extendable handle to comfortably operate the tool from ground level. Moreover, there is a long-felt need in the art for a device that prevents users from having to use standard dusters which typically just displace dust from the ceiling fan blades to the floor, requiring additional cleaning. Further, there is a long-felt need in the art for a fan blade cleaning device that eliminates the risk of injury that can be caused by carrying a cleaning device and climbing onto a ladder to clean ceiling fan blades. Finally, there is a long-felt need in the art for a fan blade cleaning device that saves extensive time and effort when cleaning ceiling fans in a home, office, etc.

The subject matter disclosed and claimed herein, in one embodiment thereof, comprises a fan blade cleaning device. The device is a no mess, no ladder cleaning device that easily and safely cleans ceiling fan blades and traps dust in one motion. The device comprises a blade component that encloses a ceiling fan blade and a finger duster component secured to the opening of the blade component for dusting. The blade component and the finger duster component are then both secured to a telescoping pole component, which can be extended to various heights.

Users would select the length of blade component needed for their fan blade size, adjust the telescopic pole component to the proper height, and gently place the blade component over and around a fan blade up to the motor with the finger duster component contacting the top of the fan blade. A user then gently slides the blade and finger duster component back to the end of the fan blade. All the dust is wiped clean from the fan blades and collects inside of the blade component for easy and convenient removal. Further, the device can be safely operated from the ground via the extendable, telescoping pole component allowing a user to adjust and clean fans at various heights. When the user is finished cleaning the fan, the blade component is then removed and emptied out into the trash, then washed, dried, and is ready to be reused.

In this manner, the fan blade cleaning device of the present invention accomplishes all of the foregoing objectives and provides users with a device that saves extensive time and effort when cleaning ceiling fans. The device provides users with a convenient way to remove and collect dust from ceiling fans. The device fits most standard ceiling fan blades and the pole component can be extended to varying heights based on a user's preferences.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a fan blade cleaning device. The device is a no mess, no ladder cleaning device that easily and safely cleans ceiling fan blades and traps dust in one motion. The device comprises a blade sleeve component that encloses a ceiling fan blade and a finger duster component secured to the opening of the blade sleeve component for dusting. The blade sleeve component and the finger duster component are then both secured to a telescoping pole component which can be extended to various heights.

In one embodiment, the fan blade cleaning device comprises a blade sleeve component of varying size and shape made available to accommodate the various styles of ceiling fan blades available. The blade sleeve component is utilized for dust wiping and trapping dirt and debris. The blade sleeve component is sized and shaped to engage a standard ceiling fan blade and is generally shaped as a tubular sleeve but can be any suitable shape as is known in the art. Specifically, this blade-engaging tubular sleeve is of a width to closely fit over the fan blade to be cleaned and of a length sufficient to encase the full length of the fan blade from the tip to the motor. The blade sleeve component is generally oval in cross-section and is designed to engage with both the upper and lower surfaces of the fan blade to be cleaned. The blade sleeve component also comprises an opening at one end which allows the fan blade to be inserted into and encapsulated by the blade sleeve component.

Generally, the blade sleeve component is manufactured of lightweight synthetic material or fine porous textile material (either woven or non-woven in construction) or woven with stretchy elastic to ensure a custom-like fit. The blade sleeve component may specifically be configured to attract dust and debris to trap dust and dirt within the interior of each sleeve component via pores which constitute dirt trapping pockets for dirt, dust, debris, etc., removed from the fan blade surfaces by the wiping action of the blade sleeve component. Specifically, the inner surface of the blade sleeve component may boast a textured, porous surface, on which dust and debris would naturally cling. Additionally, the blade sleeve component may be augmented with a cleansing solvent along with a scented component to leave behind a pleasant smell. If used, cleaning solvent is chosen from a list of cleaning solvents consisting of ammonia, soap, acetic acid, and sodium hypochlorite.

In one embodiment, the fan blade cleaning device comprises a finger duster component. The finger duster component is a long, finger-like sleeve that is secured to the opening of the blade sleeve component in order to maintain the blade sleeve component in a transversely taut condition. Specifically, the finger duster component is affixed to a top edge of the blade sleeve component at the opening of such sleeve component. In another embodiment, a finger duster component is affixed to both the top edge and the bottom edge of the opening of the blade sleeve component.

Further, the finger duster component is utilized for dust wiping and trapping dirt and debris and once in place, contacts a top surface of the fan blade. The finger duster component is generally sized and shaped as a slender, tubular sleeve with an opening at one end. Generally, the finger duster component is formed of a fine porous textile material (either woven or non-woven in construction). The pores constitute dirt trapping pockets for dirt, dust, debris, etc., removed from the fan blade surface by the wiping action of the finger duster component.

In use, the opening of the finger duster component is slid over a long, slender support member to encapsulate the support member. The support member is sized and shaped to fit within the finger duster component. Generally, the support member is slightly curved or L-shaped to maintain the opening of the blade sleeve component in a taunt configuration, allowing a user to easily slide a fan blade into the blade sleeve component. Furthermore, the support member is typically manufactured of lightweight metal, or other rigid material that can maintain its shape.

In operation, the opening of the blade sleeve component is fed over the tip end of the fan blade, such that the sleeve component is easily slipped full-length over the fan blade to its motor, such as one would apply a glove or a sock. Once the blade sleeve component is in place, the finger duster component contacts the top surface of the fan blade nearest the motor. As the blade sleeve component is withdrawn, dirt and dust on the surface of the fan blade is removed therefrom via the finger duster component. Because the blade sleeve component fits over the entire fan blade, any such displaced dirt or dust is retained within the interior of the blade sleeve component and is entrapped in the pores of the textile material forming such sleeve component. Usually all of the blades of a conventional fan can be cleaned before the blade sleeve component becomes too dirty to continue cleaning. If the blade sleeve component and finger duster component become too dirty to continue to clean the fan, the blade sleeve component and the finger duster component, once withdrawn, can be removed from the support component and turned inside out and/or vacuumed. When cleaning is completed, the blade sleeve component and the finger duster component may be washed, dried, and made ready for further use.

In one embodiment, the support member is then secured to an elongated, telescopic pole component. The telescopic pole component is an elongated tubular shaft comprising a plurality of telescoping members. Further, the telescopic pole component comprises a hollow interior recess for receiving the curved or L-shaped supporting member, which is insertable into the distal end of the elongated tubular shaft. Further, a polymeric handle component is heat-pressed onto a proximal end of the shaft to create an ergonomic handle for a user. The proximal end of the shaft is the end by which the user holds the device for cleaning purposes.

Before use, the telescopic pole component is telescopically extracted by hand and positioned at a distance predetermined from the ceiling fan blade to allow contact with the fan blade while the user is still standing on the ground. Thus, the telescopic pole component allows a user to clean the fan blades with the device without utilizing a ladder.

The fan blade cleaning device would enable users to clean their ceiling fans in a simple and efficient manner, eliminating the need to stir up piles of dust that quickly covers furniture and flooring beneath the fan. Thus, the fan blade cleaning device allows users to easily clean their ceiling fan, trapping and removing dirt, dust, and debris from each blade. Users should appreciate that dust, dirt, grime, and allergens would be contained within the blade sleeve component as opposed to blowing about the room.

Perhaps most importantly, because dust, mildew, mold spores, pet dander and other airborne allergens would adhere to the inside of the blade sleeve component, use of this device could greatly reduce harmful allergens permeating the household environment, resulting in fresher, cleaner air. Thus, the fan blade cleaning device may be greatly beneficial to those who suffer allergies, asthma, or similar respiratory ailments.

In yet another embodiment, the fan blade cleaning device comprises a plurality of indicia.

In yet another embodiment, a method of cleaning ceiling fan blades is described. The method includes the steps of providing a fan blade cleaning device comprising a blade sleeve component secured to a finger duster component which is then secured to a telescoping pole component. The method also comprises choosing a specific size of blade sleeve component, depending on the size of fan blades to be cleaned. Further, the method comprises adjusting the telescoping pole component to a desired height, depending on the height of the ceiling fan. The method comprises, sliding the blade sleeve component onto the fan blade, such that the finger duster component contacts the top surface of the fan blade. The method comprises sliding the finger duster component along the blade to wipe the fan blades clean. The method also comprises collecting dust and debris within the blade sleeve component. Finally, emptying the blade sleeve component after cleaning and washing the blade sleeve component for reuse.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
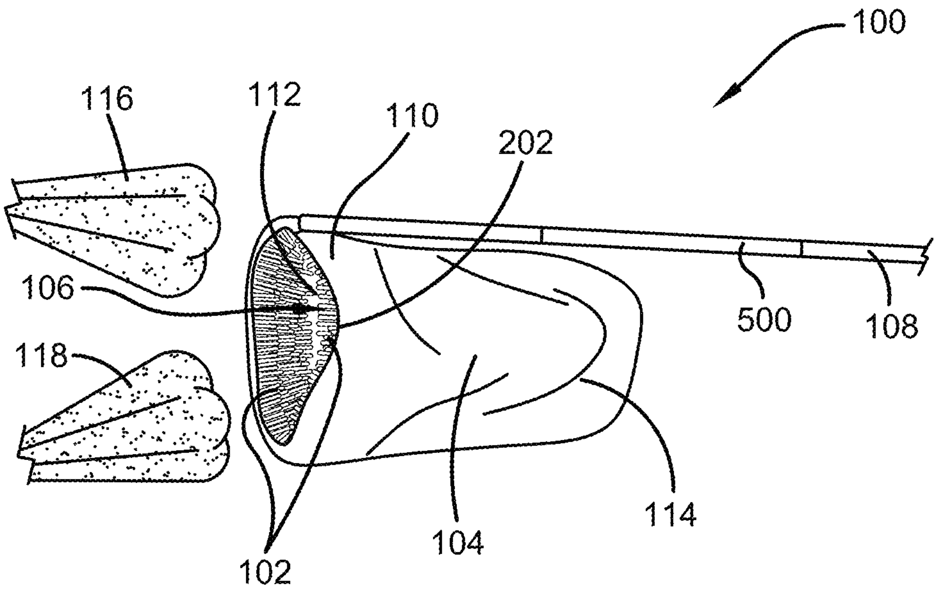
FIG. 1 illustrates a perspective view of one embodiment of the fan blade cleaning device of the present invention showing the blade component and finger duster component secured together in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a fan blade cleaning device that provides users with a cleaning tool designed to remove and collect dust from ceiling fans in one swift, convenient motion. There is also a long-felt need in the art for a fan blade cleaning device that includes a six-inch-deep finger duster opening strip within an enclosed fabric case that is placed over a fan blade to easily remove dust with ease and no mess. Further, there is a long-felt need in the art for a fan blade cleaning device that features an extendable handle to comfortably operate the tool from ground level. Moreover, there is a long-felt need in the art for a device that prevents users from having to use standard dusters which typically just displaces dust from the ceiling fan blades to the floor, requiring additional cleaning. Further, there is a long-felt need in the art for a fan blade cleaning device that eliminates the risk of injury that can be caused by carrying a cleaning device and climbing onto a ladder to clean ceiling fan blades. Finally, there is a long-felt need in the art for a fan blade cleaning device that saves extensive time and effort when cleaning ceiling fans in a home, office, etc.

The present invention, in one exemplary embodiment, is a novel fan blade cleaning device. The device is a no mess, no ladder cleaning device that easily and safely cleans ceiling fan blades and traps dust in one motion. The device comprises a blade component that encloses a ceiling fan blade and a finger duster component secured to the opening of the blade component for dusting. The blade component and the finger duster component are then both secured to a telescoping pole component, which can be extended to various heights. The present invention also includes a novel method of cleaning ceiling fan blades. The method includes the steps of providing a fan blade cleaning device comprising a blade component secured to a finger duster component, which is then secured to a telescoping pole component. The method also comprises choosing a specific size of a blade component, depending on the size of fan blades to be cleaned. Further, the method comprises adjusting the telescoping pole component to a desired height, depending on the height of the ceiling fan. The method comprises, sliding the blade component onto the fan blade, such that the finger duster component contacts the top surface of the fan blade. The method comprises sliding the blade component along the blade to wipe the fan blades clean. The method also comprises collecting dust and debris within the blade component. Finally, emptying the blade component after cleaning and washing the blade component for reuse.

Referring initially to the drawings, FIG. 1 illustrates a perspective view of one embodiment of the fan blade cleaning device 100 of the present invention. In the present embodiment, the fan blade cleaning device 100 is an improved fan blade cleaning device 100 that easily and safely cleans fan blades and traps dust. Specifically, the device 100 is a no mess, no ladder cleaning device that cleans fan blades. The fan blade cleaning device 100 comprises a finger duster component 102 with a blade sleeve component 104 secured to it that can be interchanged. Specifically, the blade sleeve component 104 encloses a ceiling fan blade (not shown) and the finger duster component 102 secures to an opening 106 of the blade sleeve component 104 for dusting the fan blade. The blade sleeve component 104 and the finger duster component 102 are then both secured to a telescoping pole component 108, which can be extended to various heights, depending on the needs and/or wants of a user to reach the ceiling fan to be cleaned.

Furthermore, the blade sleeve component 104 of the fan blade cleaning device 100 is manufactured of varying sizes and shapes to accommodate the various styles of ceiling fan blades available. The blade sleeve component 104 is utilized for collecting and trapping dirt and debris from the fan blades. The blade sleeve component 104 is sized and shaped to engage a standard ceiling fan blade and is generally shaped as a tubular sleeve but can be any suitable shape as is known in the art. Specifically, this blade-engaging tubular sleeve 104 is of a width to closely fit over the fan blade to be cleaned and of a length sufficient to encase the full length of the fan blade from the tip to the motor. The blade sleeve component 104 is generally oval in cross-section and is designed to engage with both the upper and lower surfaces of the fan blade to be cleaned. The blade sleeve component 104 also comprises an opening 106 at one end 110 which allows the fan blade to be inserted into and encapsulated by the blade sleeve component 104.

Generally, the blade sleeve component 104 is manufactured of lightweight synthetic material or fine porous textile material (either woven or non-woven in construction) or woven with stretchy elastic to ensure a custom-like fit on the fan blade. The blade sleeve component 104 may be configured specifically to attract dust and debris and trap said dust and dirt within the interior 112 of each sleeve component 104 via pores 114 which constitute dirt trapping pockets for dirt, dust, debris, etc., removed from the fan blade surfaces by the wiping action of the blade sleeve component 104. Specifically, the inner surface or interior 112 of the blade sleeve component 104 may boast a textured, porous surface 114 on which dust and debris would naturally cling. Additionally, the blade sleeve component 104 may be augmented with a cleansing solvent 116 along with a scented component 118 to leave behind a pleasant smell. If used, the cleaning solvent 116 is chosen from a list of cleaning solvents consisting of ammonia, soap, acetic acid, and sodium hypochlorite, etc.

Figure 2:
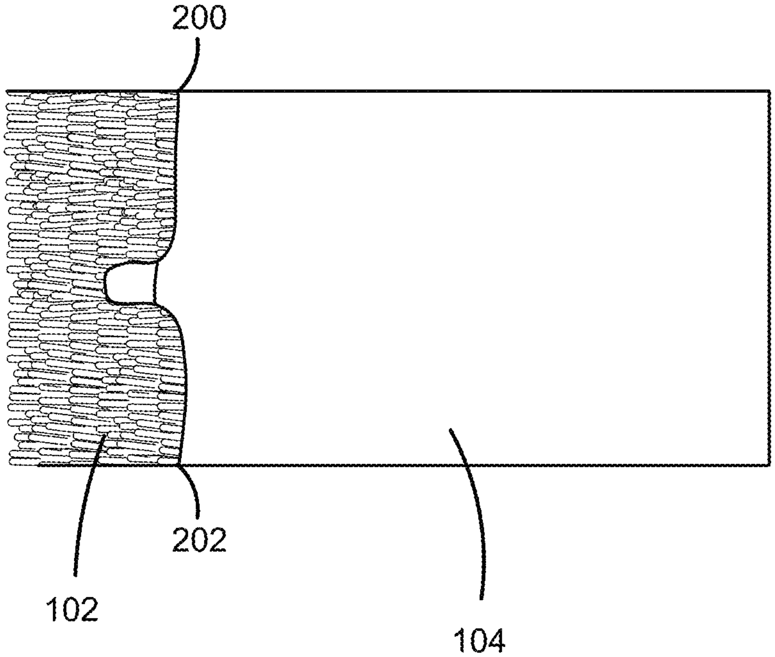
FIG. 2 illustrates a perspective view of one embodiment of the fan blade cleaning device of the present invention showing the finger duster component in accordance with the disclosed architecture.

As shown in FIG. 2, the fan blade cleaning device 100 comprises a finger duster component 102. The finger duster component 102 is a long, finger-like sleeve that is secured to the opening 106 of the blade sleeve component 104 in order to maintain the blade sleeve component 104 in a transversely taut condition. Specifically, the finger duster component 102 is affixed to a top edge 200 of the blade sleeve component 104 at the opening 106 of such sleeve component 104. In one embodiment, a finger duster component 102 is affixed to both the top edge 200 and the bottom edge 202 of the opening 106 of the blade sleeve component 104.

Further, the finger duster component 102 is utilized for wiping and trapping dirt and debris and, once in place, contacts a top surface of the fan blade. The finger duster component 102 is generally sized and shaped as a slender, tubular sleeve with an opening 204 at one end 206. Generally, the finger duster component 102 is formed of a fine porous textile material (either woven or non-woven in construction) or of a lightweight synthetic material. The pores 208 constitute dirt trapping pockets for dirt, dust, debris, etc., removed from the fan blade surface by the wiping action of the finger duster component 102.

Figure 3:
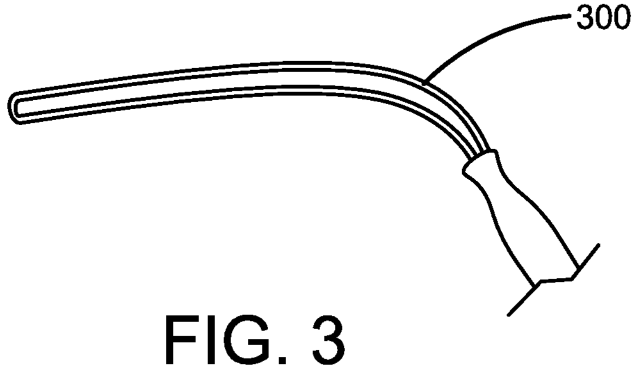
FIG. 3 illustrates a perspective view of one embodiment of the fan blade cleaning device of the present invention showing the support component for the blade component and the finger duster component in accordance with the disclosed architecture.
Figure 4:
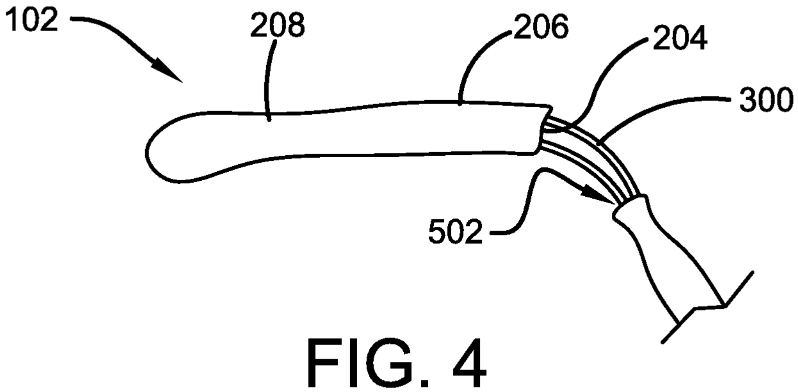
FIG. 4 illustrates a perspective view of one embodiment of the fan blade cleaning device of the present invention with the finger duster component secured to the support component in accordance with the disclosed architecture.

As shown in FIGS. 3-4, in use, the opening 204 of the finger duster component 102 is slid over a long, slender support member 300 to encapsulate the support member 300. The support member 300 is sized and shaped to fit within the finger duster component 102. Generally, the support member 300 is slightly curved or L-shaped to maintain the opening 106 of the blade sleeve component 104 in a taunt configuration, allowing a user to easily slide a fan blade into the blade sleeve component 104. Furthermore, the support member 300 is typically manufactured of lightweight metal, such as aluminum or stainless steel, or a polymer, such as polycarbonate, or any other rigid material that can maintain its shape as is known in the art, based on the needs and/or wants of a user.

In operation, the opening 106 of the blade sleeve component 104 is fed over the tip end of the fan blade, such that the sleeve component 104 is easily slipped full-length over the fan blade to its motor, such as one would apply a glove or a sock. Once the blade sleeve component 104 is in place, the finger duster component 102 contacts the top surface of the fan blade, nearest the motor. As the blade sleeve component 104 is withdrawn, dirt and dust on the surfaces of the fan blade is removed therefrom via the finger duster component 102. Because the blade sleeve component 104 fits over the entire fan blade, any such displaced dirt or dust is retained within the interior 112 of the blade sleeve component 104 and is entrapped in the pores 114 of the textile material forming such sleeve component 104. Usually all of the blades of a conventional fan can be so cleaned before the blade sleeve component 104 becomes too dirty to continue to clean. However, if the blade sleeve component 104 and finger duster component 102 become too dirty to continue to clean the fan, the blade sleeve component 104 and the finger duster component 102, once withdrawn, can be removed from the support member 300 and turned inside out and/or vacuumed. Further, when cleaning is completed, the blade sleeve component 104 and the finger duster component 102 may be washed, dried, and made ready for further use.

Figure 5:
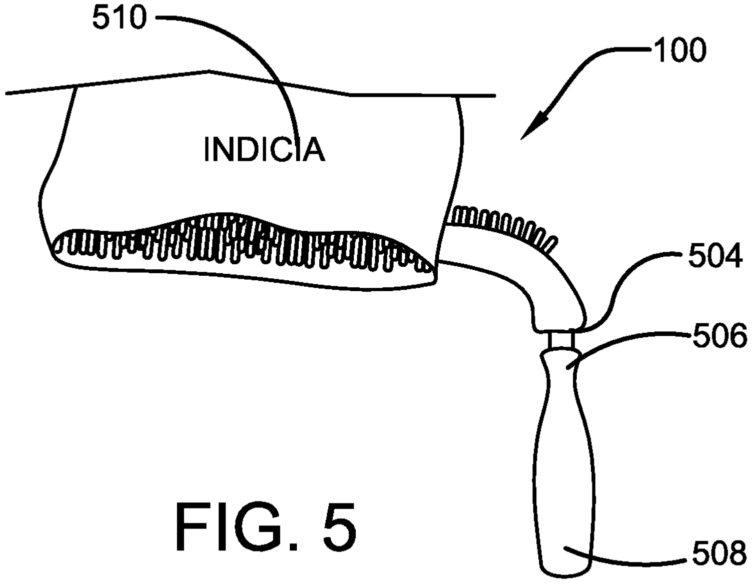
FIG. 5 illustrates a close-up, perspective view of one embodiment of the fan blade cleaning device of the present invention in accordance with the disclosed architecture.

As shown in FIG. 5, the support member 300 is then secured to an elongated, telescopic pole component 108 via any suitable securing means as is known in the art, such as press fit, locking pin, bolt, screw, etc. The telescopic pole component 108 is an elongated tubular shaft comprising a plurality of telescoping members 500. Further, the telescopic pole component 108 comprises a hollow interior recess 502 for receiving the curved or L-shaped supporting member 300 which is insertable into the distal end 504 of the telescopic pole component 108. Further, a polymeric handle component 506 is heat-pressed onto a proximal end 508 of the telescopic pole component 108 to create an ergonomic handle for a user. The handle component 506 can comprise finger grips, indentations, tread, score marks, etc., to allow a user to easily retain the shaft 108 in their hands while using the device 100. Thus, the proximal end 508 of the telescopic pole component 108 is the end by which the user holds the device 100 for cleaning purposes.

Before use, the telescopic pole component 108 is telescopically extracted by hand and positioned at a distance predetermined from the ceiling fan blade to allow contact with the fan blade while the user is still standing on the ground. Thus, the telescopic pole component 108 allows a user to clean the fan blades with the device 100 without utilizing a ladder.

The fan blade cleaning device 100 would enable users to clean their ceiling fans in a simple and efficient manner eliminating the need to stir up piles of dust that quickly cover furniture and flooring beneath the fan. Thus, the fan blade cleaning device 100 allows users to easily clean their ceiling fan, trapping and removing dirt, dust, and debris from each blade. Users should appreciate that dust, dirt, grime, and allergens would be contained within the blade sleeve component 104 as opposed to blowing about the room.

Perhaps most importantly, because dust, mildew, mold spores, pet dander and other airborne allergens would adhere to the inside of the blade sleeve component 104, use of this device 100 could greatly reduce the amount of harmful allergens permeating the household environment, resulting in fresher, cleaner air. Thus, the fan blade cleaning device 100 may be greatly beneficial to those who suffer allergies, asthma, or similar respiratory ailments.

Furthermore, the fan blade cleaning device 100 comprises a plurality of indicia 510. The blade sleeve component 104 of the device 100 may include advertising, a trademark, or other letters, designs, or characters, printed, painted, stamped, or integrated into the blade sleeve component 104, or any other indicia 510 as is known in the art. Specifically, any suitable indicia 510 as is known in the art can be included, such as, but not limited to, patterns, logos, emblems, images, symbols, designs, letters, words, characters, animals, advertisements, brands, etc., that may or may not be cleaning, fan, or brand related.

Figure 6:
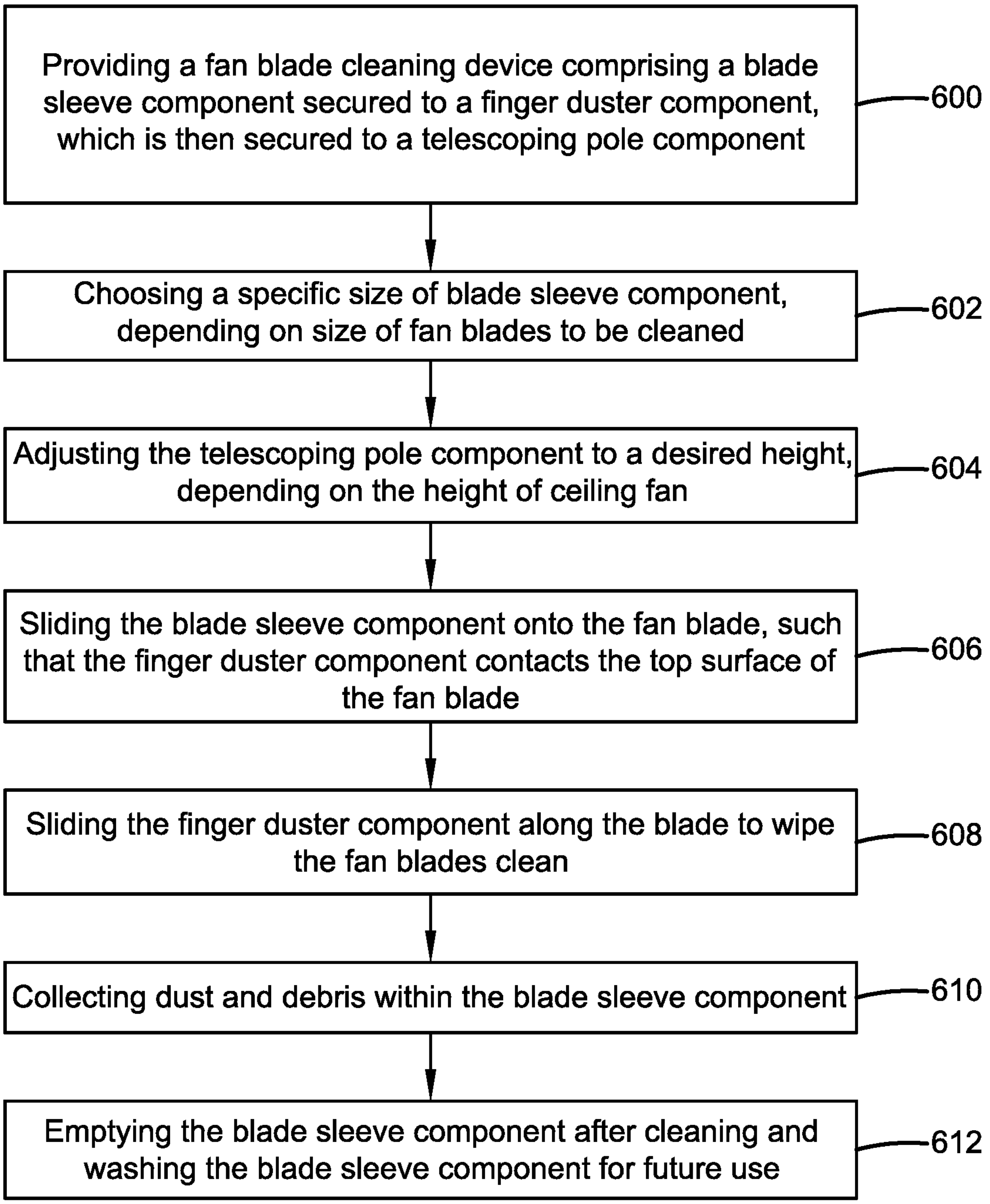
FIG. 6 illustrates a flowchart showing the method of cleaning ceiling fan blades in accordance with the disclosed architecture.

FIG. 6 illustrates a flowchart of the method of cleaning ceiling fan blades. The method includes the steps of at 600, providing a fan blade cleaning device comprising a blade sleeve component secured to a finger duster component which is then secured to a telescoping pole component. The method also comprises at 602, choosing a specific size of blade sleeve component, depending on the size of fan blades to be cleaned. Further, the method comprises at 604, adjusting the telescoping pole component to a desired height, depending on the height of the ceiling fan. The method comprises at 606, sliding the blade sleeve component onto the fan blade, such that the finger duster component contacts the top surface of the fan blade. The method comprises at 608, sliding the finger duster component along the blade to wipe the fan blades clean. The method also comprises at 610, collecting dust and debris within the blade sleeve component. Finally, at 612, emptying the blade sleeve component after cleaning and washing the blade sleeve component for reuse.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "fan blade cleaning device", "cleaning device", "fan blade device", and "device" are interchangeable and refer to the fan blade cleaning device 100 of the present invention.

Notwithstanding the foregoing, the fan blade cleaning device 100 of the present invention can be of any suitable size and configuration as is known in the art without affecting the overall concept of the invention, provided that it accomplishes the above-stated objectives. One of ordinary skill in the art will appreciate that the fan blade cleaning device 100 as shown in FIGS. 1-6 are for illustrative purposes only, and that many other sizes and shapes of the fan blade cleaning device 100 are well within the scope of the present disclosure. Although the dimensions of the fan blade cleaning device 100 are important design parameters for user convenience, the fan blade cleaning device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A fan blade cleaning device that easily and safely cleans fan blades and traps dust, the fan blade cleaning device comprising:

a blade sleeve component shaped as a tubular sleeve with an opening at one end which encloses a ceiling fan blade;

a finger duster component shaped as a tubular sleeve with an opening at one end secured to the opening of the blade sleeve component; and a telescopic pole component secured to the blade sleeve component and the finger duster component; and a curved support member configured to maintain the opening in the blade sleeve component when inserted into the blade sleeve component;

wherein once the blade sleeve component is in place, the finger duster component contacts a top surface of the ceiling fan blade; and wherein as the blade sleeve component is withdrawn, dirt and dust on the top surface of the ceiling fan blade is removed via the finger duster component and retained within an interior of the blade sleeve component; and wherein the blade sleeve component further comprises a cleaning solvent; and wherein the curved support member is insertable within a hollow interior recess within a distal end of the telescopic pole component.

2. The fan blade cleaning device of claim 1 further comprising a plurality of indicia.

3. The fan blade cleaning device of claim 1, wherein the blade sleeve component is oval in cross-section and is designed to engage with both an upper and lower surfaces of the ceiling fan blade.

4. The fan blade cleaning device of claim 3, wherein an interior of the blade sleeve component comprises a textured, porous surface on which dust and debris would cling.

5. The fan blade cleaning device of claim 1, wherein a handle component is secured to a proximal end of the telescopic pole component.

* * * * *